(12) United States Patent
Datar et al.

(10) Patent No.: US 7,962,529 B1
(45) Date of Patent: Jun. 14, 2011

(54) SCALABLE USER CLUSTERING BASED ON SET SIMILARITY

(75) Inventors: Mayur Datar, Santa Clara, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/774,775

(22) Filed: May 6, 2010

Related U.S. Application Data (63) Continuation of application No. 11/204,922, filed on Aug. 15, 2005, now Pat. No. 7,739,314.

(51) Int. Cl.
G06F 7/00 (2006.01)
G06F 17/30 (2006.01)
(52) U.S. Cl. ........................ 707/803; 707/810
(58) Field of Classification Search .................. None
See application file for complete search history.

(56) References Cited

U.S. PATENT DOCUMENTS

| | | | |
|---|---|---|---|
| 5,909,677 | A | 6/1999 | Broder et al. |
| 6,119,124 | A | 9/2000 | Broder et al. |
| 6,134,532 | A | 10/2000 | Lazarus et al. |
| 6,230,155 | B1 | 5/2001 | Broder et al. |
| 6,349,296 | B1 | 2/2002 | Broder et al. |
| 6,912,505 | B2 | 6/2005 | Linden et al. |
| 2003/0061233 | A1 | 3/2003 | Manasse et al. |
| 2004/0139072 | A1 | 7/2004 | Broder et al. |

OTHER PUBLICATIONS

European Search Report in Application No. 06801549.4, mailed Dec. 8, 2010, 10 pages.
Office Action issued on Oct. 8, 2010 in Chinese Application No. 200680038100.7, 14 pages. Includes full English translation.
Andoni et al., "Locality-sensitive hashing using stable distributions," Nearest Neighbor Methods in Learning and Vision: Theory and Practice, Darrell et al. (eds.), MIT Press, Cambridge, MA, in preparation, Chapter 4, pp. 55-67, Mar. 2006.
Broder et al., "Min-Wise Independent Permutations," Journal of Computer Systems and Sciences, 2000, 60 (3):630-659, (special issue for STOC '98), preliminary version in Proceedings of the 30th Annual ACM Symposium on Theory of Computing (1998).
Charikar, "Similarity Estimation Techniques from Rounding Algorithms," STOC '02, May 19-21, 2002, Montreal, Quebec, Canada, 9 pages.
Charikar et al., "Incremental Clustering and Dynamic Information Retrieval," STOC '97, 1997, El Paso, TX, pp. 626-635.
Cohen et al., "Finding Interesting Associations without Support Pruning," 16th Int'l Conf. on Data Engineering (ICDE), 2000, 17 pages.
Datar et al., "Locality-Sensitive Hashing Scheme Based on p-Stable Distributions", SCG '04, Jun. 9-11, 2004, pp. 253-262.

(Continued)

*Primary Examiner* — Charles Rones
*Assistant Examiner* — Harold A Hotelling
(74) *Attorney, Agent, or Firm* — Fish & Richardson P.C.

(57) ABSTRACT

Methods and apparatus, including systems and computer program products, to provide clustering of users in which users are each represented as a set of elements representing items, e.g., items selected by users using a system. In one aspect, a program operates to obtain a respective interest set for each of multiple users, each interest set representing items in which the respective user expressed interest; for each of the users, to determine k hash values of the respective interest set, wherein the i-th hash value is a minimum value under a corresponding i-th hash function; and to assign each of the multiple users to each of the respective k clusters established for the respective user, the i-th cluster being represented by the i-th hash value. The assignment of each of the users to k clusters is done without regard to the assignment of any of the other users to k clusters.

20 Claims, 4 Drawing Sheets

OTHER PUBLICATIONS

Dean and Ghemawat, "MapReduce: Simplified Data Processing on Large Clusters," OSDI, 2004, 13 pages.

Gröar, "User Profiling: Collaborative Filtering," SIKDD 2004, Oct. 12-15, 2004, Ljubljana, Slovenia, 4 pages.

Haveliwala et al., "Scalable Techniques for Clustering the Web," Proceedings of WebDB, 2000, 6 pages.

Hofmann, "Latent Semantic Models for Collaborative Filtering," ACM Transactions on Information Systems, 2004, 22 (1):89-115.

Lemire, "Scale and Translations Invariant Collaborative Filtering Systems," Information Retrieval, 2005, 8(1):129-150.

Papadimitriou et al., "Latent Semantic Indexing: A Probabilistic Analysis," PODS 98, (preliminary version) JCSS, special edition (full version), Nov. 14, 1997, 21 pages.

Schwab and Kobsa, "Adaptivity through Unobtrusive Learning," 2002, 16(3):5-9.

Wang, "Self-organising Communities Formed by Middle Agents," AAMAS '02, Jul. 15-19, 2002, Bologna, Italy, pp. 1.

Xiao et al., "Measuring Similarity of Interests for Clustering Web-Users," ADC, 2001, pp. 107-114.

Xie and Phoha, "Web User Clustering from Access Log Using Belief Function," K-CAP '01, Oct. 22-23, 2001, Victoria, British Columbia, Canada, pp. 202-208.

Yu et al., "Selecting Relevant Instances for Efficient and Accurate Collaborative Filtering," CIKM '01, Nov. 5-10, 2001, Atlanta, Georgia, pp. 239-246.

Zeng et al., "Similarity Measure and Instance Selection for Collaborative Filtering," WWW '03, May 20-24, 2003, Budapest, Hungary, pp. 652-658.

Cohen, "Size-Estimation Framework with Applications to Transitive Closure and Reachability," J. Comput. System Sci., 1997, 55(3):441-453.

Indyk and Motwani, "Approximate Nearest Neighbors: Towards Removing the Curse of Dimensionality," Proceedings of the 30th Annual ACM Symposium on Theory of Computing, 1998, 20 pages.

SCALABLE USER CLUSTERING BASED ON SET SIMILARITY

CROSS-REFERENCE TO RELATED APPLICATION

This application is a continuation of U.S. patent application Ser. No. 11/204,922, filed Aug. 15, 2005, which is incorporated herein by reference.

BACKGROUND

The present invention relates to digital data processing and more particularly to grouping users of a computer application or system into clusters.

Grouping users into clusters is done for a variety of purposes. To achieve user personalization, for example, one of the well known techniques, collaborative filtering, involves clustering users and recommending to a user items that other users in the user's cluster have expressed interest in. Conventionally, a user may be taken to have expressed interest in an item in various ways, e.g., by clicking on it, purchasing it, or adding it to a shopping cart. The recommendation can take a variety of forms, e.g., presenting to the user as part of search results, showing as news stories the user may want to read, identifying items the user may want to purchase, and so on.

One way to achieve user clustering is to define a distance measure between two users and then cluster them using well-known clustering algorithms like k-means or hierarchical agglomerative clustering (HAC). However, such techniques have shortcomings. For example, HAC has a running time of $O(n^2)$ which is prohibitive for n values that are hundreds of millions; and the k-means algorithm requires representing the mean of data points, which is not possible when the data points are sets.

SUMMARY

The present invention, in particular implementations, can provide scalable clustering of users where users are each represented as a set of elements representing items from a universe of items.

For example, given a universe of items that a user can select through interaction with a computer system, users may each express their interest in a respective subset of the items through various actions like clicking on an item, purchasing an item, adding an item to a shopping list, viewing an item, and so on. Particular implementations of the invention cluster users (i.e., assign users to clusters) in such a way that users in the same cluster are likely to have a high overlap between their respective subsets of items.

In one aspect, a computer program product in accordance with an implementation of the invention can cause data processing apparatus to obtain a respective interest set for each of multiple users, each interest set representing items in which the respective user has expressed interest through interaction with a data processing system; for each of the multiple users, determine k hash values of the respective interest set, wherein the i-th hash value is a minimum value in the respective interest set under a corresponding i-th hash function, where i is an integer between 1 and k, and where k is an integer greater than or equal to 1; and assign each of the multiple users to each of the respective k clusters established for the respective user, the i-th cluster being represented by the i-th hash value, wherein the assignment of each of the multiple users to k clusters is done without regard to the assignment of any of the other users to k clusters.

Advantageous implementations can include one or more of the following features. The product can cause data processing apparatus to record actions expressing user interest in a log; and use the log to generate the interest sets for the multiple users.

The product can cause data processing apparatus to obtain a changed interest set for a first user of the multiple users; determine k hash values for the first user using the changed interest set; and assign the first user only to each of the respective k clusters represented by the k hash values determined using the changed interest set without changing the assignment of any the other multiple users to clusters.

In another aspect, a computer program product in accordance with an implementation of the invention can cause data processing apparatus to obtain an interest set for a user, the interest set representing items in which the user has expressed interest through interaction with a data processing system; determine k hash values of the interest set, wherein the i-th hash value is a minimum value in the interest set under a corresponding i-th hash function, where i is an integer between 1 and k, and where k is an integer greater than or equal to 1; and assign the user to each of k clusters, the i-th cluster being represented by the i-th hash value.

Advantageous implementations can include one or more of the following features. The interest set has m elements; the i-th hash value is a minimum value of m applications of a one-way hash function, each of the m application hashing an i-th seed value and a respective one of the m elements of the interest set. The product can cause data processing apparatus to use the k user clusters to perform collaborative filtering for the user.

In another aspect, a system in accordance with an implementation of the invention includes a log of items selected by multiple users using a data processing system; a means for using a fingerprint function and the log of items to assign each of the multiple users to k clusters, where k is an integer greater than or equal to 1; and a collaborative filtering computer program application operable to provide information to a first user of the multiple users based on the assignment of the first user to one or more of the k clusters.

Advantageous implementations can include one or more of the following features. The information includes at least one of a recommendation, a prediction, or a ranking.

In another aspect, a computer program product in accordance with an implementation of the invention can cause data processing apparatus to use an ordered set of k elements to identify a user of a data processing system, where k is an integer greater than 1, where each of the k elements corresponds to an element in an interest set, each element in the interest set representing an item in which the user has expressed interest through actions by the user using the data processing system.

Advantageous implementations can include one or more of the following features. The product can cause data processing apparatus to use the ordered set of k elements to identify the user in performing collaborative filtering for the user. The collaborative filtering includes recommending items to the user or ranking items for the user. The product can cause data processing apparatus to receive input from the user in response to which input the data processing system removes elements from the interest set to generate a revised interest set; determine a revised ordered set of k elements where each of the k elements corresponds to an element in the revised interest set; and use the revised ordered set of k elements rather than the initial ordered set of k elements to identify the user. The ordered set of k elements identifies the user as belonging to each of k user clusters. The product can cause data processing apparatus to record actions expressing user interest in a log; and use the log to generate the interest set for the user. The data processing system includes a web site; and the interest set for the user includes representations of one or more items the user has clicked on in a web page, items the user has purchased from an on-line retailer, or items the user has added to a shopping cart. The actions by the user expressing interest in items include actions implicitly expressing interest. The actions by the user expressing interest in items include actions expressly expressing interest. The user is an individual identified by a user logon. The user is an individual identified by a cookie. The user is one or more individuals having an observed attribute in common, where the attribute is an attribute disclosed to the data processing system by each of the one or more individuals. The user is a session of an individual interacting with the data processing system. Each element in the interest set is an item that the user has selected in interaction with the data processing system.

In further aspects, implementations of the invention can includes methods corresponding to the foregoing programs and systems, and programs corresponding to the foregoing systems.

The invention can be implemented to realize one or more of the following advantages. Clustering calculations are scalable. Calculations can be performed for applications used by hundreds of millions of individual users, where individual users can have tens, hundreds, or more items represented in their interest sets. Clustering can be performed where the clustered entities are represented by subsets of a universe of items. The universe need not be predefined. Clustering is based on a set similarity measure. Clustering of new users occurs without changing any existing clustering. The clustering of one user occurs without consideration of how other users were clustered or are being clustered. However, some global values, e.g., seed values or permutations, may be shared among clusterings. By changing their selections—e.g., by deleting or adding to item selections, in effect—users can change the clusters to which they are assigned when clusters are subsequently calculated or recalculated. Cluster membership for a new user or a user with modified interest set can be calculated without using data from other users. Clustering calculations are not limited to clustering users who are individuals. For example, clustering can be done effectively whether each user is an individual, each user is an aggregations of individual, each user is an interaction with a system, or some combination of them.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
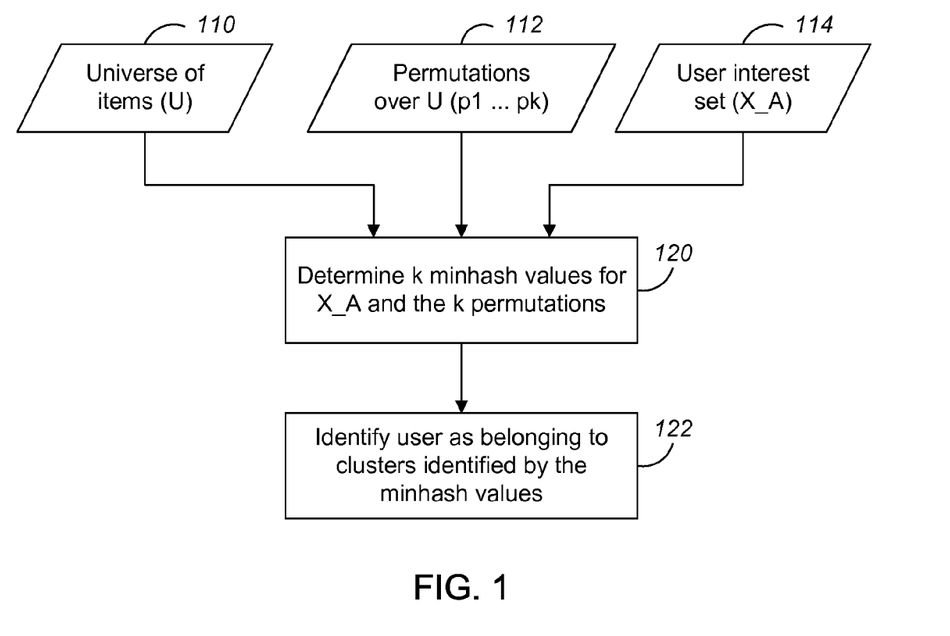
FIG. 1 is a flowchart illustrating a first method for clustering users in accordance with an embodiment of the invention.

FIG. 1 illustrates the following logical description of a minhash method for clustering users. While this method can be implemented, it is being presented here principally for explanatory purposes. A practical implementation for clustering users in a system that has a very large number of users will be described below in reference to FIG. 2.

As shown in FIG. 1, the inputs for the minhash method are a universe of items 110, denoted U; a set of k permutations 112, denoted $p1, p2, \ldots, pk$; and an interest set 114 for a user, denoted X_A for user A.

The permutations are permutations over U, and they are picked uniformly from the set of all permutations over U, so that each permutation is as likely to be picked as any other. The permutations are each a one-to-one mapping (a bijection) of U onto U. Such permutations can only be realized if U is fixed and enumerable. The integer k is a parameter of choice. Generally the value of k will be in the range of 5 to 10. However, it can be any integer 1 or greater. The method will assign k clusters to the user, denoted $C1, \ldots, Ck$. After the permutations are selected and used to assign users to clusters, if the permutations are changed, all the clusterings must be recalculated.

The interest set is a set of elements representing items from the universe U. For the uses now being described, in which the elements are the items themselves, the interest set is a set of selections by the user, X_A, of items from the universe U. These can be selected as described above. For convenience in this specification, the term "item" can refer either to an element of the interest set or an actual selection by a user, and the sense will be clear from the context.

Using this data, k hash values are determined (step 120) for the user, one for each permutation. For permutation pi, the hash value is denoted by hi(X_A). The hash value for permutation pi is the minimum element from X_A under permutation pi, i.e., the minhash value. The minimum can be determined from the values of the elements or from an ordering of U.

Each minhash value serves as the identifier for a cluster, and the user is assigned to each of the clusters. The user will belong to k clusters, the i-th cluster being identified by the i-th minhash value. Thus, for a given permutation pi, two users belong to the same cluster if and only if the minhash values of the interest sets under this permutation are identical.

This minhashing technique, associating a hash value for each data element, is one of a class of techniques, called the locality sensitive hashing techniques, that have the desirable property that two data elements have the same hash value with a certain probability that is directly proportional to the similarly between the two data elements. In the present case, if the similarity between two users A, B (represented by their interest-sets X_A and X_B) is defined as size of (X_A intersect X_B) divided by size of (X_A union X_B), then the minhashing technique has the property that the probability (defined over the set of permutations from which was chosen the actual permutation used) that the minhash values for the two users A and B are the same is equal to the similarity measure defined above. Thus, minhashing achieves a probabilistic clustering where users fall into the same cluster with probability equal to their similarity.

Because k clusters are identified (step 122), if two users have probability p ($0 \leq p \leq 1$) of being in the same cluster, then even if they do not get clustered together in one of the clusterings, they will get clustered together in a fraction p of the clusterings. This gives a smoothing effect such that each user uniformly belongs to k different clusterings and for each clustering gets clustered with other similar users. The parameter k should be chosen to optimize the tradeoff between efficiency (lower k gives better efficiency) and quality (higher k gives better quality). Although not strictly necessary, the number k will typically be a constant; and a small value like 10 can provide good results.

This minhash clustering method is very scalable and has several other advantages. For example, the running time of the method is linear in the size of the data, i.e., the total amount of (user, item) pairs.

Also, each user is clustered in isolation, i.e., independent of all other users. This is particularly interesting in the web domain where users are added, deleted and updated all the time. An advantage that follows from this is that several cases can be handled easily and incrementally that are difficult for conventional clustering algorithms. If a user is identified as spammy, i.e., as expressing sham interest for the purpose of affecting a system that uses the clustering, the user can be deleted without affecting any other user, i.e., the rest of the clustering does not change. Also, if a user who had kept her selections private decides to disclose her selections, or if a new user is added to the system, she can be added to clusters without reclustering the other users. Finally, if a user decides to change his profile by, in effect, editing his interest set, the clustering for the user can be updated in real time, as opposed to update by a batch process, to take this into account, without affecting the clustering of any other user.

Figure 2:
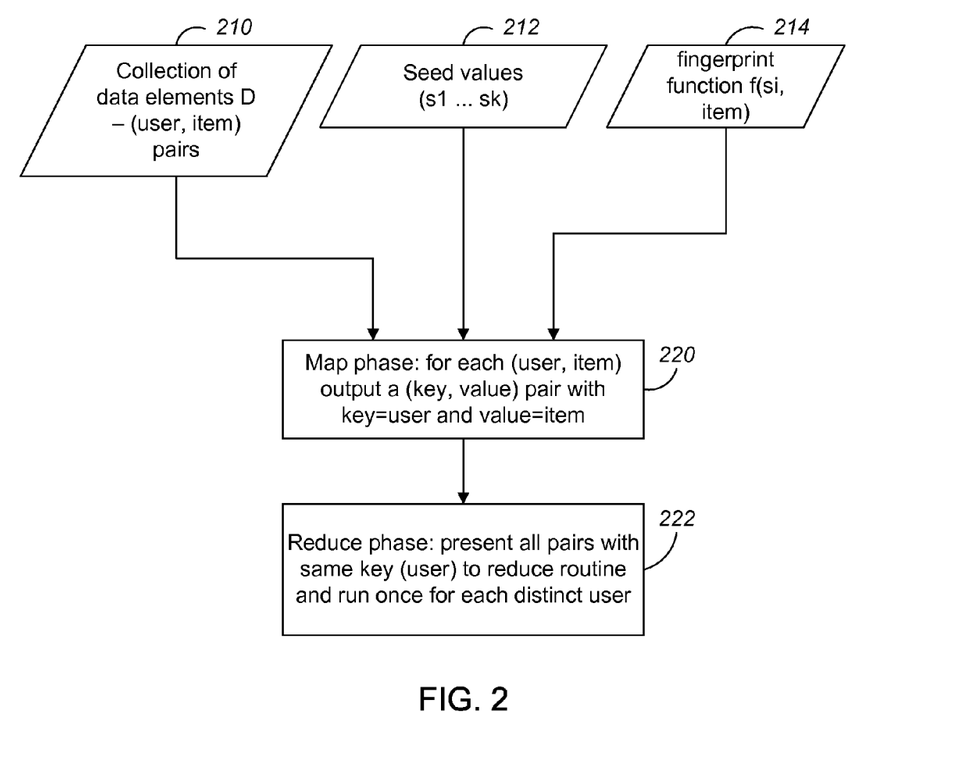
FIG. 2 is a flowchart illustrating a second method for clustering users in accordance with an embodiment of the invention.

FIG. 2 illustrates a practical implementation for clustering users in a system that has a very large number of users, up to hundreds of millions, and possibly hundreds or more items in the interest set of each user, over a universe of items that is not actually or practically enumerable. This implementation uses the MapReduce programming model and technology, which will be described later.

The inputs to this implementation are a collection 210 of data elements (e.g., result click logs, purchase logs, etc.), denoted D, stored in no particular order, an ordered set of k seed values 212, denoted s1, s2, . . . , sk, and a fingerprint function 214. Each data element can be considered a pair (user, item) indicating that a particular user has expressed interest in a certain item. Optionally, a suffix can be added to the root form of an item to indicate whether the data element refers to the first, second, etc. instance of the user expressing interest, to capture the how often the user has done so. Advantageously, the form of the item is a text string, so that the item can easily represent any user action expressing interest through any web application—i.e., through any application that uses a web browser to present a user interface to the user.

An action by which a user expresses interest can be express—e.g., when the user provides information to the system indicating the user's interest in the form of an answer to a on-line questionnaire, for example; or they can be implicit—e.g., when the user selects a news story to read on a news site.

The k seed values s1, s2, . . . , sk are numbers considered as strings of bits chosen to appear random, e.g., so that the bits in the binary representation are uniformly "0" or "1".

The fingerprint function maps a seed value and an item (from an interest set) to a large number, e.g., a 64-bit or 128-bit number.

In one implementation, the seed values are generated using the unix rand function to generate k 32-bit integer values. The rand function may have to be called more than once to generate a single seed. In this implementation, the fingerprint function implements the MD5 one-way hash algorithm, and hashes the seed value concatenated with the item (which generally will be a text string or binary data) to produce a 128-bit value.

The seed values and the fingerprint function correspond logically to the k permutations p1, . . . pk, described in reference to FIG. 1, and provide an ordering and permutation of items without requiring an enumerable universe of items.

The collection D is processed using the MapReduce framework, which will be described later.

In the map phase 220, for each (user, item) pair, a (key, value) pair is output with key=user and value=item, in a distributed fashion.

In the reduce phase 222, all such (key, value) pairs with the same key (user) are collected and presented to the reduce routine, which is run once for each distinct key (user) value, in a distributed fashion.

The reduce routine (for a particular user) processes all the items in the interest set of the user; for this description, these m items will be denoted i1, i2, . . . , im. For each seed value si, the reduce routine computes m values (one for each item) that are the fingerprint of the item and the seed value, i.e., fingerprint (si, i1). The minimum of these fingerprints, over the m items, is computed and that becomes the i-th minhash value, corresponding to the i-th seed si.

A user is represented by the k minhash values thus computed. These represent the k clusters that the user belongs to, and the user is said to be assigned to these clusters.

Figure 3:
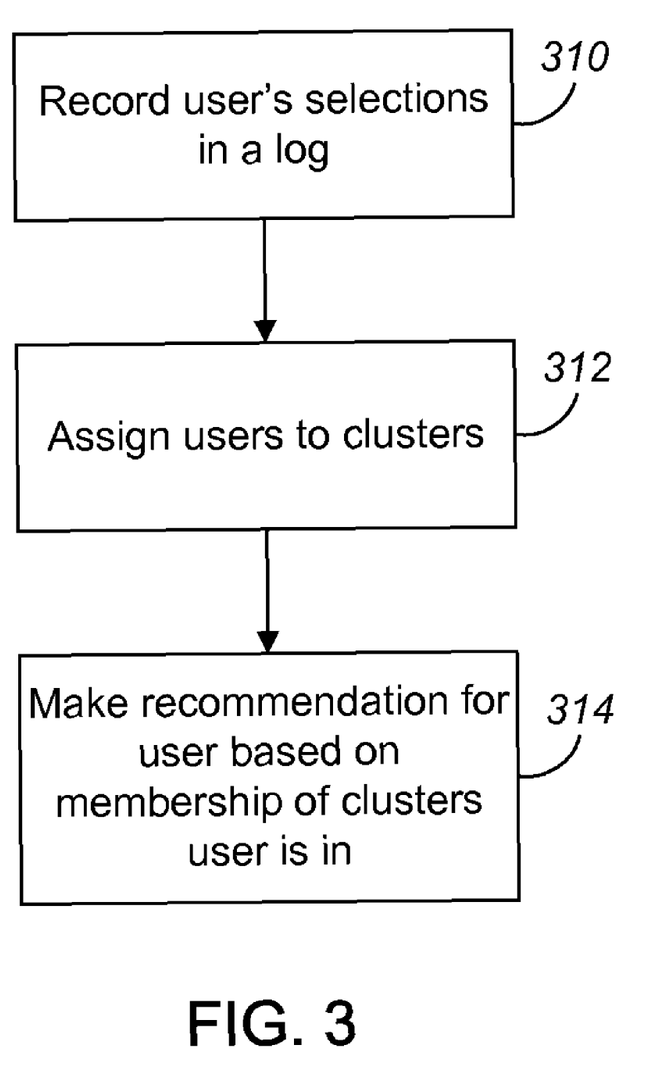
FIG. 3 is a flowchart illustrating operation of a recommender system using clusters of users in accordance with an embodiment of the invention.

As shown in FIG. 3, a recommender computer program application can use user clusters generated according to any of the methods described in this specification.

In one implementation, a system records selections made by its users in a log (step 310). The log can be stored in any form, e.g., as lines of unstructured text or as records in a structured database; and it can be stored on any computer-readable medium, e.g., on disk drives on a file server. The system can be a web site serving search results, advertisements, purchase selections, simple links to pages within or outside the site, or other items. The selections that are logged can be, but need not be, all the selections made by users of the system. For example, an application may only be interested in selections of news sites rather than all sites, or selections of items for purchase rather than all items viewed. In addition, the system can maintain multiple logs of different kinds of selections for different recommender applications, which can calculate their own respective user clusterings. For example, in a method using seeds and fingerprint functions, each separate clustering can have its own distinct seed sequence and fingerprint function.

The system can identify individuals as users by user registration and log on, by cookies, or otherwise. Optionally, a system can treat a user session as a user for purposes of clustering if it is undesirable to maintain information about individual users across multiple sessions of interaction with the system. Cookies can also be used to maintain sessions. (A cookie is a packet of information sent by a server to a web browser and then sent back by the browser each time it accesses that server.) Optionally, a system can allow individuals to determine whether or not they participate in logging, i.e., to include themselves in, or to exclude themselves from, logging of their selections.

Optionally, a system can treat some attribute or combination of attributes of an individual interacting with the system as a user. The attribute can be observed by the system, e.g., the IP (Internet Protocol) address being used or the language being used, or it can be information provided by the individual, e.g., a city or country of residence, or a subscription to service provided by the system. Thus, for example, a system could treat individuals from Cupertino as one user and individuals from Redmond as a different user. An advantage of such collective clustering is that it allows a system to provide a degree of personalization without requiring login or registration. In addition, a system can optionally either do clustering for all kinds of users—e.g., individuals and aggregations—together in the same clusters, or it can establish different clusters for different kinds of users.

The selections made by the users of the system can be simple selections or, optionally, composite selections. A composite selection is a sequence of selections, for example, a sequence of navigating from to a first web page and then directly to a second web page. A web page is a resource, typically an HTML (Hypertext Markup Language) document, served by a web server to a web browser. A web server is a computer program that accepts HTTP (Hypertext Transfer Protocol) requests, typically received over a network, and provides an HTTP responses to the requester. The HTTP response typically consists of an HTML document, but can also be a text file, an image, or some other type of document.

Based on the logged selections, users are each assigned to k clusters (step 312), as described elsewhere in this specification. This clustering of users can be updated as new users appear in the system and as selections are added to or removed from the log. Optionally, under some circumstances, not all users are assigned to k clusters. In such circumstances, one or more, but fewer than k, cluster identifiers can be obtained to find recommendations for a particular user. For example, if a system receives a request to provide a recommendation for a new user who has a set of selections, the system can optionally calculate the identity of a first cluster using the selections, use that to find recommendations, continue and similarly calculate and use a second cluster, and so on, until a system-defined sufficient number of recommendations has been found.

The recommender application can then use the user clusters to make a recommendation for a particular user (step 314). Any method for making recommendations based on grouping users each into a single cluster can be used with the multiple clusters described here. For example, such a method can be applied k times and the k results merged to provide a union set of recommended items for the user. Alternatively, the number of different results in which an item appears can be used to rank the items. Or, a few items from each of the cluster-based recommendation results can be provided to the user, to give the user a diversity of recommendations. The multiple clusters a user is assigned to may reflect different kinds of interests the user has had when using the system, and so giving the user such a diversity of recommendations makes it more likely that the recommendations include something from the user's current interest than if only a single cluster were used.

A recommender application is one example of collaborative filtering, and the methods of user clustering described in this specification can be applied to other kinds of collaborative filtering as well. In collaborative filtering, users are found who are similar to a current user, and from their preferences or behaviors, a ranking, recommendation or prediction is made for the current user. By grouping users into multiple clusters, a system implicitly identifies the users' preferences and groups items through the grouping of users.

Figure 4:
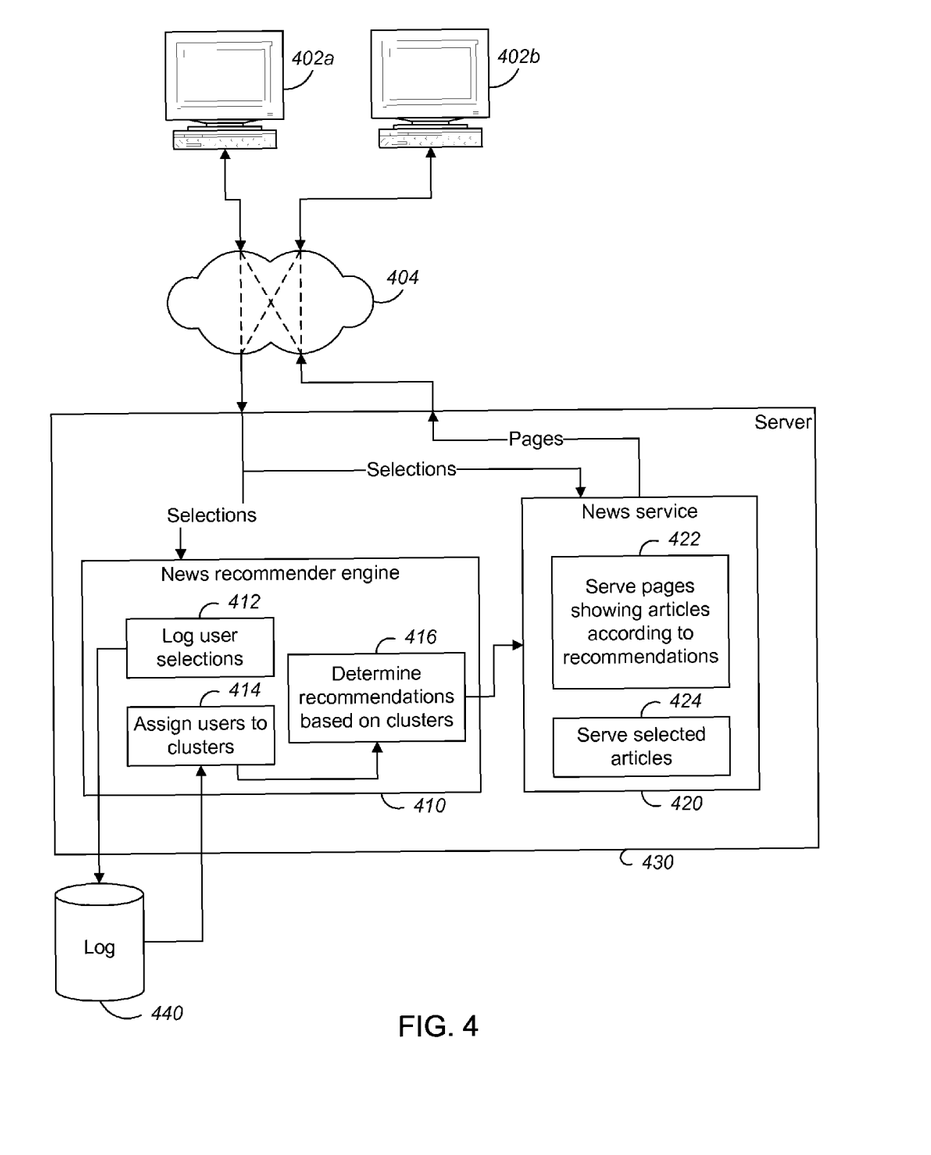
FIG. 4 is a schematic diagram illustrating a news service with a new recommender engine in accordance with one embodiment of the invention.

As illustrated schematically in FIG. 4, the techniques for assigning users to clusters described in this specification can be implemented in a news recommender engine 410 that can provide recommendations of news articles to be presented to users 402a, 402b based on selections of articles previously made by those users. The users 402a, 402b communicate through their respective browsers with one or more web servers 430 through a data communications network 404, for example, a local, wide-area, or virtual private network, or the Internet. The news service 420 is implemented as a computer program hosted on the server or servers 430 and serves web pages to the users 402a, 402b in response to the users' requests. Among the pages served by the news service 420 are pages from which a user can select one or multiple news articles for display by the user's browser. In response to user selections, the news service 420 serves the user selected articles (functionality 424). If the news recommender engine 410 has provided recommendations for a particular user, the news service can serve pages showing articles for selection by that user according to the recommendations for the user (functionality 422).

The news recommender engine 410 is implemented as a computer program running on the server or servers 430. The news recommender engine 410 receives selections from the users of the news service 420 and logs those selections (functionality 412) in a log 440. Using the information in the log 440, the engine assigns users to clusters (functionality 414) as described elsewhere in the specification. For any particular user who has been assigned to a cluster, the engine determines recommendations based on the clusters to which that user is assigned (functionality 416) and provides those recommendations to the news service 420.

In determining what recommendations to make for a particular user, the engine considers what selections were made by other users who are assigned to the same cluster or clusters as the particular user. Of the possible recommendations, the engine can optionally eliminate news articles that the user has already selected. The engine or the service can rank the recommendations on a variety of criteria, including the number of times a news article has been selected by other users assigned to the clusters to which the user is assigned, how recent the news article is, the number of sources having articles on the subject of the news article in question, and so on. In this way, a news service can provide a personalized offering and ranking of news articles to its users.

In one implementation, the news recommender engine 410 identifies users as individuals and so requires users to log in and register to get personalized recommendations. In other implementations, users can be identified implicitly or as collective groups, as described elsewhere in this specification.

A recommender engine can be implemented along these lines to support personalization of other kinds of services, for example, services offering selections of images, blogs, or shopping information.

Although illustrated in FIG. 4 as separate modules, the functionalities of the engine and the service need not be implemented in this way; in particular, the engine can be implemented as part of the implementation of the service.

The following paragraphs describe the MapReduce programming model and an implementation of the model for processing and generating large data sets. The model and its library implementation will both be referred to as MapReduce. Using MapReduce, programmers specify a map function that processes a key/value pair to generate a set of intermediate key/value pairs, and a reduce function that merges all intermediate values associated with the same intermediate key. Programs written in this functional style can automatically be parallelized and executed on a large cluster of commodity computers. The runtime system or framework can be implemented to partition the input data, schedule the program's execution across a set of machines, handle machine failures, and manage the required inter-machine communication.

A MapReduce computation takes a set of input key/value pairs, and produces a set of output key/value pairs. The user expresses the computation as two functions: Map and Reduce.

Map, written by the user, takes an input key/value pair and produces a set of intermediate key/value pairs. The MapReduce library groups together all intermediate values associated with the same intermediate key I and passes them to the Reduce function.

The Reduce function, also written by the user, accepts an intermediate key I and a set of values for that key. It merges together these values to form a possibly smaller set of values. Typically just zero or one output value is produced for each Reduce invocation. The intermediate values are supplied to the user's reduce function through an iterator. In this way lists of values that are too large to fit in memory can be handled.

Consider the problem of counting the number of occurrences of each word in a large collection of documents. The user would write code similar to the following pseudo-code:

```
map(String key, String value):
    // key: document name
    // value: document contents
    for each word w in value:
        EmitIntermediate(w, "1");
reduce(String key, Iterator values):
    // key: a word
    // values: a list of counts
    int result=0;
    for each v in values:
        result+=ParseInt(v);
    Emit(AsString(result));
```

The map function emits each word plus an associated count of occurrences (just '1' in this simple example). The reduce function sums together all counts emitted for a particular word.

In one implementation, to perform a computation, the user writes code to fill in a specification object with the names of the input and output files, and optional tuning parameters. The user then invokes a MapReduce function, passing it the specification object. The user's code is linked together with the MapReduce library.

Even though the previous pseudo-code is written in terms of string inputs and outputs, conceptually the map and reduce functions supplied by the user have associated types:

map (k1, v1)→list(k2, v2)
reduce (k2, list(v2))→list(v2)

That is, the input keys and values are drawn from a different domain than the output keys and values. Furthermore, the intermediate keys and values are from the same domain as the output keys and values.

Many different implementations of the MapReduce model are possible.

The following paragraphs describe an implementation targeted to a computing environment having large clusters of commodity personal computers connected together with switched Ethernet. In this environment machines typically have 2-4 GB (gigabytes) of memory per machine, a cluster has hundreds or thousands of machines, storage is provided by inexpensive IDE (Integrated Drive Electronics standard) disks attached directly to individual machines, a distributed file system is used to manage the data stored on these disks that uses replication to provide availability and reliability on top of unreliable hardware, and users submit jobs to a scheduling system. Each job consists of a set of tasks, and is mapped by the scheduler of the scheduling system to a set of available machines within a cluster.

The Map invocations are distributed across multiple machines by automatically partitioning the input data into a set of M splits. The input splits can be processed in parallel by different machines. Reduce invocations are distributed by partitioning the intermediate key space into R pieces using a partitioning function (e.g., hash(key) mod R). The number of partitions (R) and the partitioning function are specified by the user.

When the user program calls the MapReduce function, the following sequence of actions occurs:

The MapReduce library in the user program first splits the input files into M pieces of typically 16 megabytes to 64 megabytes (MB) per piece (controllable by the user). It then starts up many copies of the program on a cluster of machines.

One of the copies of the program is the master. The rest are workers that are assigned work by the master. There are M map tasks and R reduce tasks to assign. The master picks idle workers and assigns each one a map task or a reduce task.

A worker assigned a map task reads the contents of the corresponding input split. It parses key/value pairs out of the input data and passes each pair to the user-defined Map function. The intermediate key/value pairs produced by the Map function are buffered in memory.

Periodically, the buffered pairs are written to local disk, partitioned into R regions by the partitioning function. The locations of these buffered pairs on the local disk are passed back to the master, who is responsible for forwarding these locations to the reduce workers.

When a reduce worker is notified by the master about these locations, it uses remote procedure calls to read the buffered data from the local disks of the map workers. When a reduce worker has read all intermediate data, it sorts it by the intermediate keys so that all occurrences of the same key are grouped together. The sorting is useful because typically many different keys map to the same reduce task. If the amount of intermediate data is too large to fit in memory, an external sort is used.

The reduce worker iterates over the sorted intermediate data and for each unique intermediate key encountered, it passes the key and the corresponding set of intermediate values to the user's Reduce function. The output of the Reduce function is appended to a final output file for this reduce partition.

When all map tasks and reduce tasks have been completed, the master wakes up the user program. At this point, the MapReduce call in the user program returns back to the user code.

After successful completion, the output of the execution is available in the R output files (one per reduce task, with file names as specified by the user). Users do not need to combine these R output files into one file; they can pass these files as input to another MapReduce call, or use them from another distributed application that is able to deal with input that is partitioned into multiple files.

The master keeps several data structures. For each map task and reduce task, it stores the state (idle, in-progress, or completed) and the identity of the worker machine (for non-idle tasks).

The master is the conduit through which the location of intermediate file regions is propagated from map tasks to reduce tasks. Therefore, for each completed map task, the master stores the locations and sizes of the R intermediate file regions produced by the map task. Updates to this location and size information are received as map tasks are completed. The information is pushed incrementally to workers that have in progress reduce tasks.

Because this implementation MapReduce library is designed to process very large amounts of data using hundreds or thousands of machines, the library tolerates machine failures gracefully.

The master pings every worker periodically. If no response is received from a worker in a certain amount of time, the master marks the worker as failed. Any map tasks completed by the worker are reset back to their initial idle state, and therefore become eligible for scheduling on other workers. Similarly, any map task or reduce task in progress on a failed worker is also reset to idle and becomes eligible for rescheduling.

Completed map tasks are re-executed on a failure because their output is stored on the local disk(s) of the failed machine and is therefore inaccessible. Completed reduce tasks do not need to be re-executed because their output is stored in a global file system.

When a map task is executed first by worker A and then later executed by worker B (because A failed), all workers executing reduce tasks are notified of the re-execution. Any reduce task that has not already read the data from worker A will read the data from worker B.

Because there is only a single master, its failure is unlikely; therefore the MapReduce computation is aborted if the master fails. Users or user programs can check for this condition and retry the MapReduce operation if they desire.

When the user supplied map and reduce operators are deterministic functions of their input values, this distributed implementation produces the same output as would have been produced by a non-faulting sequential execution of the entire program. Each in-progress task writes its output to private temporary files. When a map task completes, the worker sends a message to the master and includes the names of the R temporary files in the message. If the master receives a completion message for an already completed map task, it ignores the message. Otherwise, it records the names of R files in a master data structure. When a reduce task completes, the reduce worker atomically renames its temporary output file to the final output file. If the same reduce task is executed on multiple machines, multiple rename calls will be executed for the same final output file. The atomic rename operation provided by the underlying file system guarantees that the final file system state contains just the data produced by one execution of the reduce task.

The implementation conserves network bandwidth by taking advantage of the fact that the input data is stored on the local disks of the machines that make up a cluster. The file system divides each file into 64 MB blocks and stores copies of each block on different machines. The MapReduce master takes the location information of the input files into account and attempts to schedule a map task on a machine that contains a replica of the corresponding input data. Failing that, it attempts to schedule a map task near a replica of that task's input data (e.g., on a worker machine that is on the same network switch as the machine containing the data).

For dynamic load balancing, M and R should be much larger than the number of worker machines. There are practical bounds on how large M and R can be in this implementation, because the master must make O(M+R) scheduling decisions and keep O(M×R) states in memory, as described above. Furthermore, R is often constrained by the user because the output of each reduce task ends up in a separate output file. In practice, M would be chosen so that each individual task has roughly 16 MB to 64 MB of input data so that the locality optimization described above is most effective, and R would be a small multiple of the number of worker machines expected to be used.

The total time taken for a MapReduce operation can be affected adversely by a straggler: a machine that takes an unusually long time to complete one of the last few map or reduce tasks in the computation. To alleviate the problem of stragglers, when a MapReduce operation is close to completion, the master schedules backup executions of the remaining in progress tasks. The task is marked as completed whenever either the primary or the backup execution completes.

In addition to the basic functionality described above, the implementation provides the following useful extensions.

In some cases, it is useful to partition data by some particular function of the key. To support this, the user of the MapReduce library can provide a partitioning function.

The implementation guarantees that within a given partition, the intermediate key/value pairs are processed in increasing key order. This makes it easy to generate a sorted output file per partition, which is useful when the output file format needs to support efficient random access lookups by key, or users of the output find it convenient to have the data sorted.

In some cases, there is significant repetition in the intermediate keys produced by each map task, and the user-specified Reduce function is commutative and associative. An example of this is the word counting example, above. Each map task may produce hundreds or thousands of records of the form <the, 1>. All of these counts will be sent over the network to a single reduce task and to be added together by the Reduce function to produce one number. To provide for such cases, the implementation allows the user to specify an optional combiner function that does partial merging of data before it is sent over the network.

The combiner function is executed on each machine that performs a map task. The same code can be used to implement both the combiner and the reduce functions. The only difference between a reduce function and a combiner function is how the MapReduce library handles the output of the function. The output of a reduce function is written to the final output file. The output of a combiner function is written to an intermediate file that will be sent to a reduce task.

The MapReduce library provides support for reading input data in several different formats. For example, "text" mode input treats each line as a key/value pair: the key is the offset in the file and the value is the contents of the line. Another common supported format stores a sequence of key/value pairs sorted by key. Each implementation of an input type knows how to split data of its type into meaningful ranges for processing as separate map tasks (e.g., text mode's range splitting ensures that range splits occur only at line boundaries). Users can add support for a new input type by providing an implementation of a simple reader interface. In addition, a reader is not limited to providing data read from a file. For example, a reader can read records from a database or from data structures mapped in memory.

In a similar fashion, the implementation supports a set of output types for producing data in different formats, and it is easy for user code to add support for new output types.

Sometimes bugs in user or third-party code cause the Map or Reduce functions to crash deterministically on certain records. Sometimes it is acceptable to ignore a few records, for example, when doing statistical analysis on a large data set. The implementation provides an optional mode of execution where the MapReduce library detects which records cause deterministic crashes and skips these records in order to make forward progress.

For this mode, each worker process installs a signal handler that catches segmentation violations and bus errors. Before invoking a user Map or Reduce operation, the MapReduce library stores the sequence number of the argument in a global variable. If the user code generates a signal, the signal handler sends a "last gasp" UDP (User Datagram Protocol) packet that contains the sequence number to the MapReduce master. When the master has seen more than one failure on a particular record, it indicates that the record should be skipped when it issues the next re-execution of the corresponding Map or Reduce task.

More information about MapReduce can be found in J. Dean and S. Ghemawat, MapReduce: Simplified Data Processing on Large Clusters, Proceedings of the 6th Symposium on Operating Systems Design and Implementation, pp. 137-150 (Dec. 6, 2004), the contents of which are incorporated here by reference.

Another method of clustering of users into multiple clusters using a locality sensitive hashing scheme will now briefly be described. In this method, each user has a profile represented as a vector of high dimension characterizing the user. A set of k hash functions operating on such vectors is chosen. The i-th hash value for a user profile represents the i-th cluster the user is assigned to. Locality sensitive hash functions useful for this method are described in Charikar, *Similarity Estimation Techniques from Rounding Algorithms*, 34th ACM Symposium on Theory of Computing, May 19-21, 2002, Montreal, Quebec, Canada.

In one implementation of such a method, the users are represented by a list of <term, weight> pairs. As before, k is the number of clusters and the number of hash values calculated for a user. The number of seed values will be given as 8k for illustration, though in general what is given as the constant 8 is a parameter. The 8k random seed values are represented as strings denoted $s\_1, s\_2, \ldots s\_8k$, and are chosen to appear random, e.g., so that the bits in the binary representation are uniformly "0" or "1". For every user, the i-th hash value is computed as follows:

For b from 1 to 8:
do
initialize sum=0;
for all <term_j, weight_j> pairs in the user's list:
do
  if (fingerprint(term_j+s_((i−1)*8+b)) has least significant bit=1)

sum=sum+weight_j else sum=sum−weight_j done
if (sum>0)
  b-th bit of i-th hash value is set to 1.
else
  b-th bit of i-th hash value is set to 0.
done.

The term fingerprint (term_j+s_((i−1)*8+b) represents the fingerprint function (calculated as described above) of the j-th term (term_j) concatenated with the seed string s_((i−1)*8+b), i.e., the ((i−1)*8+b)-th seed string.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium, e.g., a machine-readable storage device, a machine-readable storage medium, a memory device, or a machine-readable propagated signal, for execution by, or to control the operation of, data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the steps recited in the claims can be performed in a different order and still achieve desirable results.

What is claimed is:

1. A system comprising:
   one or more computers; and
   a computer-readable medium coupled to the one or more computers having instructions stored thereon which, when executed by the one or more computers, cause the one or more computers to perform operations comprising:
   obtaining a set of data elements that represent items in which a particular user has expressed interest through interaction with one or more web applications;
   applying a fingerprint function and k distinct seed values to each of the data elements to generate a set of k minhash values, wherein k is an integer parameter, and wherein each minhash value corresponds to a respective data element of the set of data elements; and
   assigning the particular user to k clusters, each of which is represented by a respective corresponding one of the k minhash values.

2. The system of claim 1, wherein the data elements are text strings or binary data.

3. The system of claim 1, wherein applying the fingerprint function and the k distinct seed values further comprises:
   generating i hash values for each of the k distinct seed values, by applying the fingerprint function and the respective seed value to each of the data elements, wherein i represents a quantity of data elements in the set;
   selecting, for each of the k distinct seed values, a minimum hash value from among the i hash values generated for the respective seed value; and
   establishing the k respective minimum hash values as the set of k minhash values.

4. The system of claim 1, wherein k is an integer parameter between 5 and 10, inclusive.

5. The system of claim 1, wherein each item is a search result or a news story that the particular user has selected.

6. The system of claim 1, wherein each item is an item that the particular user has purchased or added to a shopping cart.

7. The system of claim 1, wherein each item represents a sequence of selections made by the particular user to navigate between web pages.

8. The system of claim 1, wherein:
   the operations further comprise obtaining a collection of data pairs, each data pair identifying a user and an item in which the user has expressed interest; and
   obtaining the set of data elements further comprises processing the collection of data pairs by a reduce routine that uses data that identifies the particular user as a key.

9. The system of claim 1, wherein fingerprint function is a RAND function and the hash values are 32-bit integer values or the fingerprint function is a function that performs an MD5 one-way hash algorithm and the hash values are 128-bit values.

10. The system of claim 1, wherein assigning the particular user to the k clusters occurs without affecting an assignment or non-assignment of any other user to any of the k clusters.

11. The system of claim 1, wherein the operations further comprise:
    determining that the particular user has expressed sham interest in the items; and
    un-assigning the particular user from the k clusters that are represented by the k minhash values, without affecting an assignment of any other user to any of the k clusters.

12. The system of claim 1, wherein:
    the operations further comprise determining that the particular user has elected to publicize the items in which the particular user has expressed interest; and
    assigning the particular user to the k clusters further comprises assigning the particular user to the k clusters in response to determining that the particular user has elected to publicize the items in which the particular user has expressed interest.

13. The system of claim 1, wherein:
    the operations further comprise determining that the particular user has edited the items in which the particular user has expressed interest; and
    assigning the particular user to the k clusters further comprises assigning the particular user to the k clusters in response to determining that the particular user has edited the items in which the particular user has expressed interest.

14. A computer-implemented method comprising:
    obtaining a set of data elements that represent items in which a particular user has expressed interest through interaction with one or more web applications;
    applying a fingerprint function and k distinct seed values to each of the data elements to generate a set of k minhash values, wherein k is an integer parameter, and wherein each minhash value corresponds to a respective data element of the set of data elements; and
    assigning, by one or more computers, the particular user to k clusters, each of which is represented by a respective corresponding one of the k minhash values.

15. A computer storage medium encoded with a computer program, the program comprising instructions that when executed by one or more computers cause the one or more computers to perform operations comprising:
  obtaining a set of data elements that represent items in which a particular user has expressed interest through interaction with one or more web applications;
  applying a fingerprint function and k distinct seed values to each of the data elements to generate a set of k minhash values, wherein k is an integer parameter, and wherein each minhash value corresponds to a respective data element of the set of data elements; and
  assigning the particular user to k clusters, each of which is represented by a respective corresponding one of the k minhash values.

16. The computer storage medium of claim 15, wherein applying the fingerprint function and the k distinct seed values further comprises:
  generating i hash values for each of the k distinct seed values, by applying the fingerprint function and the respective seed value to each of the data elements, wherein i represents a quantity of data elements in the set;
  selecting, for each of the k distinct seed values, a minimum hash value from among the i hash values generated for the respective seed value; and
  establishing the k respective minimum hash values as the set of k minhash values.

17. The computer storage medium of claim 15, wherein:
  the operations further comprise obtaining a collection of data pairs, each data pair identifying a user and an item in which the user has expressed interest; and
  obtaining the set of data elements further comprises processing the collection of data pairs by a reduce routine that uses data that identifies the particular user as a key.

18. The computer storage medium of claim 15, wherein assigning the particular user to the k clusters occurs without affecting an assignment or non-assignment of any other user to any of the k clusters.

19. The computer storage medium of claim 15, wherein the operations further comprise:
  determining that the particular user has expressed sham interest in the items; and
  un-assigning the particular user from the k clusters that are represented by the k minhash values, without affecting an assignment of any other user to any of the k clusters.

20. The computer storage medium of claim 15, wherein:
  the operations further comprise determining that the particular user has elected to publicize the items in which the particular user has expressed interest; and
  assigning the particular user to the k clusters further comprises assigning the particular user to the k clusters in response to determining that the particular user has elected to publicize the items in which the particular user has expressed interest.

* * * * *